(12) United States Patent
Platt

(10) Patent No.: US 11,288,746 B2
(45) Date of Patent: *Mar. 29, 2022

(54) METHOD FOR GRANTING ACCESS TO A COMMUNICATIONS NETWORK IN EXCHANGE FOR PERFORMING TASKS ASSOCIATED WITH THE COMMUNICATIONS NETWORK

(71) Applicant: David Platt, Lewes, DE (US)

(72) Inventor: David Platt, Lewes, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 17/070,239

(22) Filed: Oct. 14, 2020

(65) Prior Publication Data
US 2021/0049693 A1 Feb. 18, 2021

Related U.S. Application Data

(63) Continuation-in-part of application No. 16/656,405, filed on Oct. 17, 2019, now Pat. No. 10,846,688.
(Continued)

(51) Int. Cl.
| | |
|---|---|
| G06Q 40/04 | (2012.01) |
| H04L 9/32 | (2006.01) |
| G06Q 20/36 | (2012.01) |
| G06Q 20/12 | (2012.01) |
| G06Q 40/02 | (2012.01) |

(Continued)

(52) U.S. Cl.
CPC ......... *G06Q 40/04* (2013.01); *G06Q 10/1053* (2013.01); *G06Q 20/127* (2013.01); *G06Q 20/1235* (2013.01); *G06Q 20/3676* (2013.01); *G06Q 20/3678* (2013.01); *G06Q 30/0208* (2013.01); *G06Q 30/0633* (2013.01); *G06Q 40/02* (2013.01); *H04L 9/3213* (2013.01); *H04L 12/4641* (2013.01); *H04L 63/0272* (2013.01); *H04L 67/141* (2013.01); *H04L 67/143* (2013.01); *H04L 67/146* (2013.01);
(Continued)

(58) Field of Classification Search
CPC ............... G06Q 40/04; G06Q 10/1053; G06Q 20/1235; G06Q 20/127; H04L 9/3213; H04L 12/4641
See application file for complete search history.

(56) References Cited

U.S. PATENT DOCUMENTS

| | | |
|---|---|---|
| 5,930,777 A | 7/1999 | Barber |
| 6,839,683 B1 | 1/2005 | Walker |

(Continued)

FOREIGN PATENT DOCUMENTS

| | | |
|---|---|---|
| AU | 5799400 A1 | 1/2001 |
| CN | 104520832 A | 4/2015 |

(Continued)

*Primary Examiner* — Scott C Anderson
(74) *Attorney, Agent, or Firm* — Gearhart Law LLC

(57) ABSTRACT

Token exchange systems, methods and apparatus are disclosed that allow a user to get access to a wired, wireless, or virtual network or the like by earning tokens to be used for said access, in which the user may earn tokens by making purchases or completing tasks in a token exchange system. In an exemplary embodiment, the user connects to a network, interacts with the network in order to earn tokens by making purchases through said network or completing tasks assigned by said network, and exchanges tokens for access time, whereby said user will be connected to the network or the internet for an amount of time commensurate with the amount of tokens exchanged for the access time.

19 Claims, 4 Drawing Sheets

Related U.S. Application Data

(60) Provisional application No. 62/791,438, filed on Jan. 11, 2019.

(51) Int. Cl.
*G06Q 30/06* (2012.01)
*G06Q 30/02* (2012.01)
*G06Q 10/10* (2012.01)
*H04L 12/46* (2006.01)
*H04L 67/306* (2022.01)
*H04L 67/54* (2022.01)
*H04L 67/141* (2022.01)
*H04L 67/146* (2022.01)
*H04L 67/143* (2022.01)
*H04L 29/06* (2006.01)

(52) U.S. Cl.
CPC ............ *H04L 67/24* (2013.01); *H04L 67/306* (2013.01); *G06Q 2220/00* (2013.01)

(56) References Cited

U.S. PATENT DOCUMENTS

| | | | |
|---|---|---|---|
| 7,095,842 B2 | 8/2006 | Brown et al. | |
| 7,346,545 B2 | 3/2008 | Jones | |
| 7,505,942 B2 | 3/2009 | Shooks | |
| 8,406,748 B2 | 3/2013 | Raleigh et al. | |
| 10,460,305 B1 | 10/2019 | Fine | |
| 10,846,688 B2 | 11/2020 | Platt | |
| 2008/0270240 A1 | 10/2008 | Chu | |
| 2010/0228613 A1 | 9/2010 | Anderson | |
| 2011/0195726 A1 | 8/2011 | Horvitz | |
| 2011/0238505 A1 | 9/2011 | Chiang | |
| 2012/0036051 A1 | 2/2012 | Sachson | |
| 2014/0149203 A1 | 5/2014 | Narancsik et al. | |
| 2014/0207565 A1 | 7/2014 | Jacobs | |
| 2014/0300923 A1 | 10/2014 | Sarangamath | |
| 2015/0046247 A1 | 2/2015 | Rajappa | |
| 2016/0071146 A1 | 3/2016 | Chan | |
| 2017/0330181 A1 | 11/2017 | Ortiz | |
| 2019/0158469 A1 | 5/2019 | Gonzalez | |
| 2020/0226587 A1 | 7/2020 | Platt | |

FOREIGN PATENT DOCUMENTS

| | | |
|---|---|---|
| CN | 104867028 A | 8/2015 |
| EP | 1196901 A1 | 4/2002 |
| EP | 1523604 A2 | 4/2005 |
| GB | 2370946 B | 7/2004 |
| WO | 2006009716 A2 | 1/2006 |
| WO | 2007091256 A2 | 8/2007 |
| WO | 2008048479 A2 | 4/2008 |

METHOD FOR GRANTING ACCESS TO A COMMUNICATIONS NETWORK IN EXCHANGE FOR PERFORMING TASKS ASSOCIATED WITH THE COMMUNICATIONS NETWORK

CROSS-REFERENCE TO RELATED APPLICATIONS

This application is a U.S. Continuation-in-Part (CIP) Non-Provisional Patent Application that claims priority to U.S. Non-Provisional patent application Ser. No. 16/656,405, filed on Oct. 17, 2019, which claims priority to U.S. Provisional Patent Application Ser. No. 62/791,438, filed on Jan. 11, 2019, the entire contents of which are incorporated herein by reference.

FIELD OF THE EMBODIMENTS

The field of the embodiments of the present invention relate to systems, methods and apparatus of communication network (e.g. Internet-based) payment systems, including the field of access to a wired, wireless or virtual network including the internet.

BACKGROUND OF THE EMBODIMENTS

Access to the internet has become a part of our everyday lives. Information is vital to our modern society, and access to that information usually happens over the internet. We use it for everything. We work online, shop online and even go to school online. Many people are choosing online shopping over traditional shopping due to the often-lower prices and convenience of delivery.

Most users access the internet through the network of an Internet Service Provider (ISP) that charges them a subscription fee. For some people, it is difficult to afford the expense of paying to subscribe to an Internet Service Provider.

There is currently no way to be granted access to the internet over a network by making purchases through the network or performing tasks assigned by the network that is providing the access.

Digital currency is beginning to supplement traditional currency. Online communities are adapting different methods to pay each other in services and goods, using digital tokens as a way to represent value. There is currently no digital currency that represents an amount of data or access to a network.

As described below, embodiments of the present invention include the creation, maintenance and use of user profiles in Internet usage, including targeted advertising and social media, using systems and methods different from those of the prior art systems and methods.

SUMMARY OF THE EMBODIMENTS

The embodiments of the present invention are directed to systems, methods and apparatus involving providing network access in exchange for credits obtained by a user in conjunction with creation and maintenance of user accounts in a user-specific networked environment.

The method and the system of this invention provide a means for a user to gain access to a network or the internet, by completing a token acquisition activity, such as making purchases through the network or performing tasks assigned by the network. Based on the purchases or performance, a token that represents an amount of data or time may be issued to the user by the network. The user can exchange that token for access to the network or the internet. The token can be any credit, unit, device, or digital currency used to represent an amount of time or data as a measure of accessing a network.

Further, the embodiments of the present invention represent a commodity that is to be used for various services, traded, and exchanged amongst users. In economics, a commodity is an economic good or service that has full or substantial fungibility. That is, the market treats instances of the good as equivalent or nearly so with no regard to who produced them. The commodity may have a set value (e.g. 1 token=1 GB of data) or may have a fluid value where the value is determined by supply and demand or another methodology. Regardless of the value, the embodiments of the present invention are digital tokens (e.g., a currency) backed by data as a standard.

In one embodiment of the present invention, users can freely exchange earned tokens amongst themselves.

In one embodiment of the present invention, a user can earn tokens to exchange for access to a network or the internet by making purchases through the network or through a third-party affiliate of the network.

In another embodiment of the present invention, a user can earn tokens to exchange for access to a network or the internet by participating in marketing activities within the network or through a third-party marketing service. Such activities include but are not limited to viewing advertisements or taking surveys.

In another embodiment of the invention, a user can earn tokens to exchange for access to a network or the internet by performing tasks assigned by the network or a third-party agency of the network such as work for hire.

In accordance with a first aspect of the invention, a token exchange system is disclosed. The token exchange system includes a user interface, a virtual private network (VPN), a protocol, a user account database, a transaction database, and a carrier interface. The user interface is adapted to: provide a user with functionality to log into the system; and receive, from the user, login information associated with a user account. The VPN manages a user connection to and access with the Internet. The protocol manages the user connection to and access with the Internet by encrypting data. The user account database is adapted to: interact with the user interface to receive the login information associated with the user account; store the login information associated with the user account; and generate a user wallet for the user account. The user wallet is adapted to: include and account for one or more tokens as credit to the user account; and communicate with a network bank. The network bank is adapted to manage transactions within the token exchange system. The transaction database is adapted to manage token exchange activity of the user account. The carrier interface is adapted to provide the token exchange system with connectivity and access to the Internet.

Moreover, the user interface is adapted to: query, in real-time, the user wallet to determine if the user has the one or more tokens. In response to a determination, in real-time, that the user has at least one token of the one or more tokens, the user interface is adapted to prompt the user, in real-time, to divest a quantity of the one or more tokens in exchange for access to the Internet for an amount of time. In response to a determination, in real-time, that the user fails to have any tokens of the one more tokens, the user interface is adapted to prompt the user, in real-time, with an option to acquire the quantity of the one or more tokens by performing a token-acquisition activity, where the token-acquisition activity is selected from the group consisting of: performance of work for hire, online shopping, participation in a marketing activity, and a purchase of a subscription; determine, in real-time, performance of the token-acquisition activity; and supply, in real-time, the quantity of the one of the one or more tokens to the user wallet. The carrier interface is adapted to: receive, in real-time, the divestment from the user; connect, in real-time, the user to the Internet via the VPN and the protocol for the amount of time associated with the quantity of the one or more tokens; and remove, in real-time, the quantity of the one or more tokens from the user wallet.

In accordance with a second aspect of the invention, a method is disclosed. The method is executed by a token exchange system for providing a token exchange system. The method includes numerous process steps, such as: providing a user interface adapted to: provide a user with functionality to log into the system; and receive, from the user, login information associated with a user account. The method also includes: providing a virtual private network (VPN) to manage a user connection to and access with the Internet; providing a protocol that manages the user connection to and access with the Internet by encrypting data; and providing a user account database adapted to: interact with the user interface to receive the login information associated with the user account; store login information associated with the user account; and generate a user wallet for the user account. The method further includes: providing the user wallet adapted to: include and account for one or more tokens as credit to the user account; and communicate with a network bank. The network bank is adapted to manage transactions within the token exchange system.

Moreover, the method includes: providing a transaction database adapted to manage token exchange activity of the user account; providing a carrier interface adapted to provide the token exchange system with connectivity and access to the Internet; and querying, in real-time by the user interface, the user wallet to determine if the user has the one or more tokens. In response to a determination, in real-time by the user interface, that the user has at least one token of the one or more tokens, the method also includes: prompting the user, in real-time, to divest a quantity of the one or more tokens in exchange for access to the Internet for an amount of time; receiving, by the carrier interface in real-time, the divestment from the user; connecting, by the carrier interface in real-time, the user to the Internet via the VPN and the protocol for the amount of time associated with the quantity of the one or more tokens; and removing, by the carrier interface in real-time, the quantity of the one or more tokens from the user wallet. Further, in response to a determination, in real-time by the user interface, that the user fails to have any tokens of the one more tokens, the method includes: prompting the user, in real-time by the user interface, with an option to acquire the quantity of the one or more tokens by performing a token-acquisition activity, wherein the token-acquisition activity is selected from the group consisting of: performance of work for hire, online shopping, participation in a marketing activity, and a purchase of a subscription; determining, in real-time by the user interface, performance of the token-acquisition activity; and supplying, in real-time by the user interface, the quantity of the one of the one or more tokens to the user wallet.

In accordance with a third aspect of the invention, a method of exchanging tokens to provide a user with access to the Internet via a virtual private network (VPN) and a protocol is disclosed. The method includes numerous process steps, such as: providing the user with a restricted connection to the Internet via the VPN; providing the user with a secure connection to the Internet via the protocol that manages the user connection to and access with the Internet by encrypting data; providing the user with restricted access by the restricted connection to a token exchange system at which the user may acquire a token in exchange for completing a token-acquisition activity; allowing the user to acquire the token in exchange for completing the token-acquisition activity; providing the user with restricted access by the restricted connection to the token exchange system at which the user may divest a token in exchange for providing the user with less-restricted access by a less-restricted connection to the Internet via the VPN and the protocol for an amount of access per token; allowing the user to divest the token in exchange for providing the user with less-restricted access by the less-restricted connection to the Internet via the VPN and the protocol for the amount of access per token; and providing the user with less-restricted access by the less-restricted connection to the Internet via the VPN and the protocol for the amount of access per token. The token-acquisition activity is selected from a group of activities consisting of making a purchase through the token exchange system and completing a task through the token exchange system. Further, the amount of access is selected from a group of access measures consisting of blocks of time to elapse and blocks of data to be transferred.

Further aspects of the invention are set forth herein. The details of exemplary embodiments of the invention are set forth in the accompanying drawings and the description below. Other features, objects, and advantages of the invention will be apparent from the description and drawings, and from the claims.

BRIEF DESCRIPTION OF THE DRAWINGS

By reference to the appended drawings, which illustrate exemplary embodiments of this invention, the detailed description provided below explains in detail various features, advantages and aspects of this invention. As such, features of this invention can be more clearly understood from the following detailed description considered in conjunction with the following drawings, in which the same reference numerals denote the same, similar or comparable elements throughout. The exemplary embodiments illustrated in the drawings are not necessarily to scale or to shape and are not to be considered limiting of its scope, for the invention may admit to other equally effective embodiments having differing combinations of features, as set forth in the accompanying claims.

LISTING OF DRAWING REFERENCE NUMERALS

Figure 1:
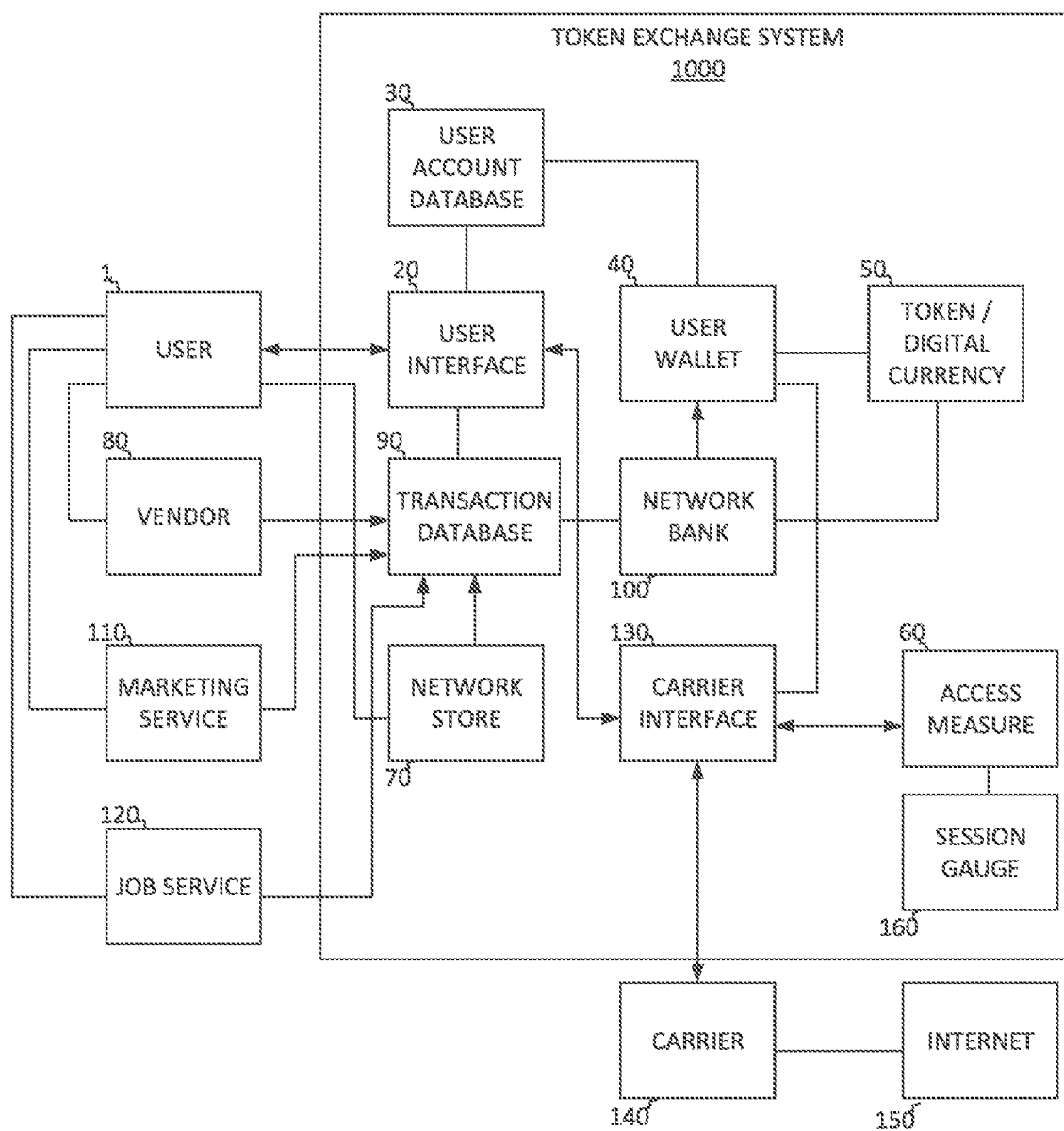
FIG. 1 shows a block diagram of an exemplary embodiment of the invention depicting an exemplary token exchange system and network, according to aspects of the invention.

Below are reference numerals denoting the same, similar or comparable elements throughout the drawings and detailed description of the invention:
a Token Exchange System 1000
a User 1
a User Interface 20
a User Account Database 30
a User Wallet 40
a Token 50
an Access Measure 60
a Network Store 70
a Vendor 80
a Transaction Database 90
a Network Bank 100
a Marketing Service 110
a Job Service 120
a Carrier Interface 130
a Carrier 140 a Network/the Internet 150
a Session Clock 160
a Method 2000 of accessing the Internet 150 through System 1000
 connecting 2100 a device to the network of the System 1000
 requesting 2200 to perform a task as a token-acquisition activity
 receiving 2300 the task from the network
 performing 2400 the task
 receiving 2500 a Token 50 from the network
 divesting 2600 Token 50 in exchange for access to the Internet 150 in an Access Measure 60 relative to the Token 50
 granting 2700 access to the Internet 150 in the amount of the Access Measure 60 obtained in exchange for the divested Token 50
a Method 3000 of logging in to the System 1000, checking the User Wallet 40 for digital currency, and granting access the Internet 150 through the System 1000
 connecting 3100 a device to the network of System 1000
 checking 3200 if the User 1 has a User Account, and if yes, go to logging on 3300; if not:
  asking 3210 the User 1 whether to create a User Account;
  if the User 1 declines to create a User Account:
   ending 3220 the process;
  if the User 1 agrees to create a User Account:
   creating 3230 a User Account
   logging on 3300 to a User Account of the System 1000
   checking 3400 whether the User Waller 40 has Tokens 50 with which to access the Internet 150, and if yes, go to divesting 3500.
  If not:
   providing 3410 the User 1 with options to acquire Tokens 50 by interacting with the network, as in the Method 2000
   asking 3500 the User 1 whether to divest Tokens 50 in exchange for access to the Internet 150, and if yes, go to receiving 3600;
   if not:
    ending 3510 the process,
   receiving 3600 the Tokens 50 from the User 1
   granting 3700 the User 1 access to the Internet 150 in the amount of the Access Measure 60 obtained in exchange for, and relative to the value of divested Tokens 50
a Method 4000 of earning Digital Currency 50 by interacting with the network of System 1000
 prompting 4100 the User 1 to choose from various token-acquisition activities to acquire a Token 50
 asking 4110 the User 1 whether the User 1 wants to purchase a subscription, and if yes:
  receiving 4112 monetary payment from the User 1
  issuing 4200 the User 1 one or more Tokens 50;
 if the User 1 chooses not to purchase a subscription:
  asking 4120 the User 1 if the User 1 wants to participate in a marketing task, and if yes:
   providing 4122 the User 1 with the marketing task
   issuing 4200 the User 1 one or more Tokens 50 if the User 1 chooses not to participate in a marketing task:
    asking 4130 the User 1 if the User 1 wants to shop online, and if yes:
     providing 4132 the User 1 with access to shop online
     issuing 4200 the User 1 one or more Tokens 50;
    if the User 1 chooses not to shop online:
     asking 4140 the User 1 if the User 1 wants to perform work for hire, and if yes:
      providing 4142 the User 1 with access to perform the work for hire
      issuing 4200 the User 1 one or more Tokens 50;
     if the User 1 chooses not to perform work for hire:
      asking 4150 the User 1 if the User 1 wants to perform some other token-acquisition activity or task, and if yes:
       providing 4152 the User 1 with
       access to perform the other token-acquisition activity or task;
       issuing 4200 the User 1 one or more Tokens 50;
      if the User 1 chooses not to perform some other token-acquisition activity or task:
       ending 4300 the process, and the System 1000 may redirect the User 1 out of the token-acquisition portion of the User Interface 20

DESCRIPTION OF THE PREFERRED EMBODIMENTS

The invention is directed to systems, methods and apparatus involving providing network access to a user in conjunction with creation and maintenance of credits, such as tokens, in a user account in a user-specific networked environment such as Internet browsing, online shopping, and social media. At a high level, a user may acquire a credit, such as a token, in exchange for completing an acquisition activity, and the user may divest the token in exchange for access to network, typically the Internet in general.

The present invention provides a user wishing to access a network or the internet with a means to do so by earning credits, such as tokens, that represent an amount of data of network bandwidth, through interactions with the network providing the access, or with third-party affiliates of the network. For instance, a user may choose to make purchases directly from an online store on the network application or may choose to be connected to a website or application of a third-party vendor. Further, a user may choose to make purchases directly from a physical/brick and mortar store using the same digital tokens/currency.

Once the user makes a purchase, for example, the network will credit the user's account with one or more tokens, which the user can exchange for access on the network measured in, for instance, blocks of time (e.g., 1-minute blocks), or blocks of data bandwidth (e.g., 1 MB blocks of data transferred), as measures of said access. The user would be given access to the network until the system measures that the blocks of time have elapsed or blocks of data have been transferred.

In some embodiments, the system provides additional means for a user to earn tokens, should the user not wish to make a purchase. For instance, a user can choose to view video advertisements provided by a third-party marketing service or participate in other marketing promotions, such as taking surveys, testing products, or other tasks that are part of a marketing campaign. The marketing campaign might involve the user surfing social media and 'liking' posts, re-posting posts, triggering 'views,' or posting comments, for instance.

As used in this application, the term 'token' refers to any credit, unit, device, or digital currency that can be acquired by a user in completing an acquisition activity, such as shopping through a network, and that represents a measure of access to the network, including an amount of data to be transferred during said access, or an amount of time to elapse while accessing the network or the internet.

Numerous possible embodiments of the token exchange system are envisioned. An exemplary embodiment of the invention is described below and depicted in the accompanying drawing.

Referring to the Figures, a token exchange system may interact with numerous existing systems across a distributed network, such as the Internet in general. In some embodiments, a user may access the system via a dedicated computer, kiosk, or network terminal that does not directly provide network connectivity to a user device to access the system. In some embodiments, a user may access the system via a general-purpose computer, kiosk, or network terminal that does not directly provide network connectivity to a user device to access the system. In some embodiments, a user may access the system via a general-purpose computer, kiosk, or network terminal that provides wired network connectivity to a user device to access the system. In some embodiments, a user may access the system via a general-purpose computer, kiosk, network terminal, or network access point that provides wireless network connectivity to a user device to access the system.

Inasmuch as the token exchange system itself may be a network-based system accessed by a user's own device having network connectivity, and the user's device may connect to the system through an 'open' or 'free' Internet connection, the system may connect to the user's device initially through a restricted connection that offers the user's device restricted access to the Internet. The restricted connection may restrict the bandwidth, data types, data transfer speeds, permitted IP addresses, etc., with which the user's device accesses the system. Likewise, the restricted access may restrict the user's device to accessing only network destinations permitted by the system, which may include, for instance, only permitting access to a user interface upon the user logging into the system. For example, the system may comprise a virtual private network (VPN) that manages the user connection and access in interacting with the Internet. In another illustrative example, the system may utilize an Internet protocol, allowing for a secure connection between a client and a server. The Internet protocol is a set of rules governing the format of data sent over the Internet or other network. Such Internet protocol encrypts data to manage a user's connection and access in interacting with the Internet. Once the system has logged the user into the system, and the user has divested tokens in exchange for access to the Internet, the system may remove some of the restrictions on the restricted connection (e.g., increasing data transfer speeds) to provide a less-restricted connection to the Internet. Likewise, the system may remove some of the restrictions on the restricted access (e.g., allowing the user device to navigate to permitted websites, which conceivably could exclude blacklisted sites known for malware), to provide a less-restricted access to the Internet. These restrictions of the connection and access would be in addition to the physical limitations and restrictions of the network, the network access point, network destinations, and the user's device, through the user device and the system communicate, which presumably are beyond the control of the system. For instance, the system would be prevented from providing the user device with access to network destinations requiring user authentication and permission that the user does not have. As such, the user may gain access to content on the network or over the secure connection between the client and the server, where the token represents data.

Referring to FIG. 1, FIG. 1 shows a block diagram of an exemplary Token Exchange System 1000 to provide a User 1 with access to a Network 150, such as the Internet 150. The Network 150 may include the Internet, for example, embodying primarily the physical interconnectivity through which the other systems interact. As depicted in FIG. 1, a User 1 uses a User Interface 20 to access a User Account Database 30, and a User Wallet 40 that may include a Token 50 as a form of Digital Currency 50 to be exchanged for Access Measure 60 (e.g., time or data). FIG. 1 also depicts the interaction of a Network Store 70, a Vendor 80, and a Transaction Database 90 regarding transactions involving a Network Bank 100, a Marketing Service 110, and a Job Service 120. The Network Store 70 may be adapted to manage purchases within the System 1000, such as to offer items for purchase by the User Account, execute purchases by the User Account, and report purchase activity as token-acquisition activity to credit a Token 50 the User Account. The Transaction Database 90 may be adapted to interact with the Network Store 70, the Vendor 80, the Marketing Service 110, and the Job Service 120, to report the token-acquisition activity as a basis to credit a Token 50 to the User Account. The Network Bank 100 may be adapted to manage transactions within the system, such as receive payments from the User Account and track credits of Tokens 50 to, and debits of Tokens 50 from, the User Wallet 40 of the User Account.

FIG. 1 depicts network access provided to the User 1 through a Carrier Interface 130, a Carrier 140, the Internet 150, and a Session Gauge 160 (e.g., a clock or data meter) As depicted in FIG. 1, the System 1000 interacts with the Internet 150 through the Carrier Interface 130 that connects and communicates with the Carrier 140, which may comprise, for instance, an Internet Service Provider (ISP) or telecommunications company, and the Carrier 140 provides the System 1000 with connectivity and access to the Internet 150.

In order to access the Internet 150, the User 1 engages the User Interface 20 of the System 1000. The User 1 is prompted to enter login information that is associated with a User Account on the System. If the User 1 does not have a User Account registered with the System, the User Interface 20 provides the User 1 with an option to create one. Once created, the User's account information is stored in the User Account Database 30 and a User Wallet 40 is created for that account. When the User 1 logs into the System 1000, the User Interface 20 queries the User Wallet 40 for that account to check if the User 1 has any Tokens 50. If the System 1000 finds that the User 1 does not have any Tokens 50, the user interface 20 provides the User 1 with options to acquire one or more Tokens 50, such as by earning Tokens performing a task as a token-acquisition activity.

In an exemplary embodiment of the System 1000, the User 1 may perform a token-acquisition activity in the form of making an online purchase through the Network Store 70 or through one of the third-party affiliates of the System 1000, also referred to as Vendors 80. The value or quantity of Tokens 50 being earned may be determined by the value, type, and/or nature of purchase being made. After a purchase has been made, the transaction is recorded in the Transaction Database 90 and the User 1 is issued Digital Currency 50 (e.g., one or more Tokens 50) from the Network Bank 100 into the User Wallet 40.

In another embodiment of the System 1000, the User 1 may choose to not make an online purchase, but still may choose to earn Tokens 50 by completing another token-acquisition activity, such as participating in a marketing campaign. In this instance, the User Interface 20 provides the User 1 the option to participate in a marketing campaign through a Marketing Service 110. Such participation can include watching a brief video, taking part in a survey, being the subject of a product test, or engaging in any other marketing interaction. The value or quantity of Tokens 50 being earned may be determined by the task being performed. Once the task is complete, the Marketing Service 110 sends a completion notice to the Transaction Database 90, and the User 1 is issued Tokens 50 into the User Wallet 40 from the Network Bank 100.

In another embodiment of the System 1000, the User 1 may choose to perform work for hire in exchange for Tokens 50. In this instance, the User Interface 20 directs the User 1 to a Job Service 120 website or application, where the User 1 can perform freelance work. Once the agreed upon work has been completed, the Job Service 120 sends a completion notice to the Transaction Database 90, and the User 1 is issued Tokens 50 into the User Wallet 40 from the Network Bank 100. The value or quantity of Tokens 50 being earned may be determined by the work being performed.

If during the query the System 1000 finds that the User has Tokens 50 in the User Wallet 40, the User 1 has the option to use the Tokens 50 that the User 1 already has, or the User 1 can choose to perform additional token-acquisition activities to earn more Tokens 50.

If the User 1 chooses to use the Tokens 50 already in the User Wallet 40, the User Interface 20 requests the User 1 to input how much Access Measure 60 (e.g., time or data) the User 1 chooses to use. The User 1 may respond with the desired amount of Access Measure 60, and the System 1000 queries the User Wallet 40 to check if the User 1 has enough Digital Currency 50 for the requested amount of Access Measure 60. If the User 1 has enough Digital Currency 50 for the requested amount of Access Measure 60, the User Interface 20 creates a session with the Carrier Interface 130 with a Session Gauge 160 designating and measuring the amount of Access Measure 60. The Carrier Interface 130 then creates a connection between the User 1 and the Carrier 140, which allows the User 1 to access the Internet 150. Upon exhaustion of the Access Measure 60 as measured by the Session Gauge 160, the connection between the User 1 and the Carrier 140 is terminated, and the User Interface 20 informs the User 1 that the session has ended.

If the User 1 does not have enough Tokens 50 in the User Wallet 40 for a requested amount of Access Measure 60, the User Interface 20 informs the User 1 of how much Access Measure 60 is available to the User 1 based on the Tokens 50 currently in the User Wallet 40. The User 1 is then given the options of earning more Tokens 50 or reducing the amount of Access Measure 60.

Methods in accordance with aspects of the invention include, for instance, a method of providing the Token Exchange System 1000 of FIG. 1; a method of acquiring Digital Currency 50 and exchanging it for access to the Internet 150; a method of creating a User Account, checking whether it has Tokens 50, inquiring whether a Token 50 will be exchanged for access to the Internet 150, and granting an Access Measure 60 to the Internet 150; and a method of providing a User 1 with options to acquire Tokens 50 and issue the Tokens 50 to the User Waller 40.

Figure 2:
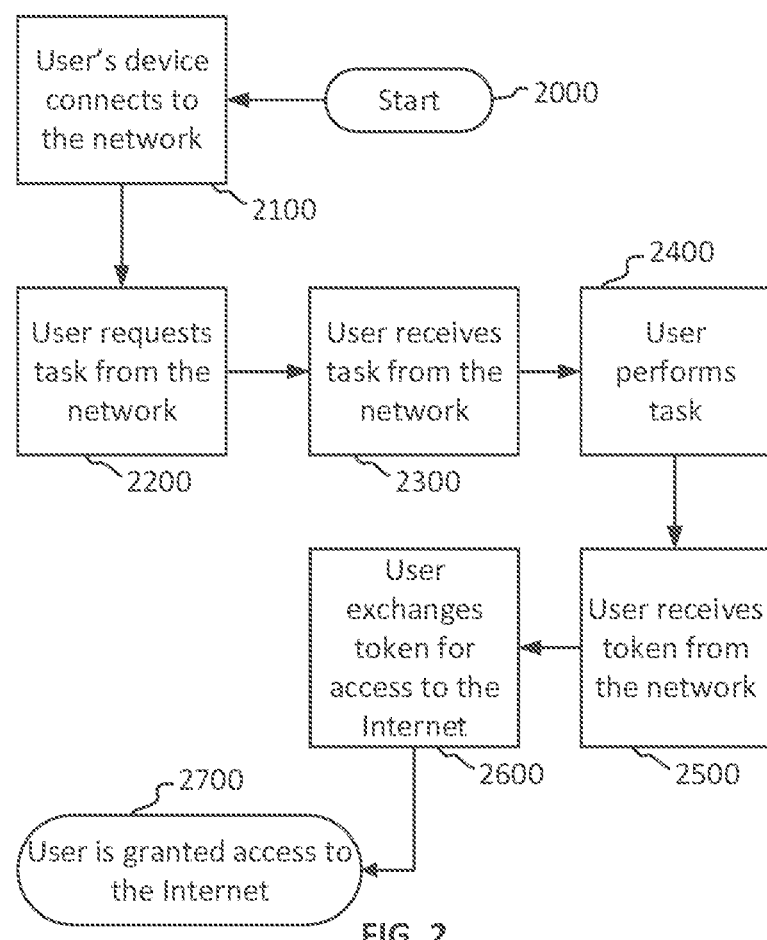
FIG. 2 shows a block diagram of an exemplary method, depicting exemplary steps taken by user to access the internet through the network of FIG. 1, according to aspects of the invention.

Referring to FIG. 2, FIG. 2 shows a block diagram of an exemplary Method 2000, depicting exemplary steps taken by User 1 to access the Internet 150 through the network of System 1000 in FIG. 1. The User 1 may begin by connecting 2100 a device to the network of the System 1000. The User 1 may request 2200 to perform a task as a token-acquisition activity in the System 1000. The User 1 may receive 2300 the task from the network, and the User 1 may perform 2400 the task Once the task is performed, the User 1 may receive 2500 a Token 50 from the network. Once the Token 50 is credited to the User Wallet 40 for performing the task, the User 1 may divest 2600 the Token 50 in exchange for access to the Internet 150 in an Access Measure 60 relative to the value of the Token 50 exchanged. Once the Token 50 is exchanged 2600, the User 1 is credited the Access Measure 60 and granted 2700 access to the Internet 150 in the amount of the Access Measure 60 obtained in exchange for the divested Token 50.

Figure 3:
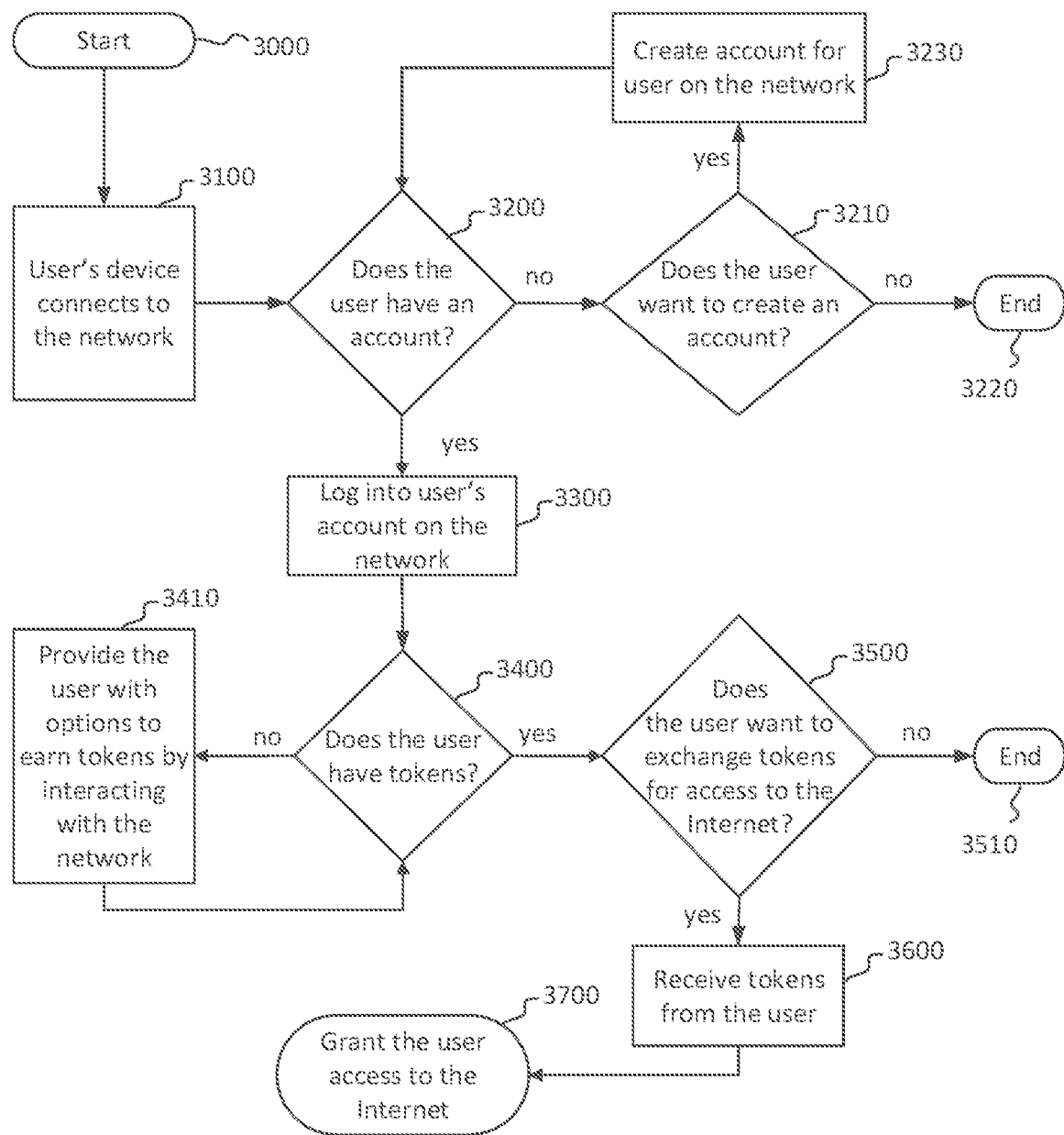
FIG. 3 shows a block diagram of another exemplary method, depicting exemplary steps taken by user to login to the system and have the system check the user account for currency to access the internet through the network of FIG. 1, according to aspects of the invention.

Referring to FIG. 3, FIG. 3 shows a block diagram of another exemplary Method 3000, depicting exemplary steps taken by User 1 to login to the System 1000 and have the System 1000 check the User Account Database 30 for the User Account and the User Wallet 40 for digital currency to access the Internet 150 through the network of System 1000 in FIG. 1. The User 1 may begin by connecting 3100 a device to the network of System 1000, and the System 1000 may check 3200 if the User 1 has a User Account. If not, the System 1000 asks 3210 the User 1 whether to create a User Account. If the User 1 declines to create a User Account, the process may end 3220. If the User 1 creates 3230 a User Account, the User 1 is redirected back to prompting the User 1 to log 3300 into a User Account of the System 1000. The User 1 may log in 3300, and the System 1000 may check 3400 whether the User Waller 40 has Tokens 50 with which to access the Internet 150. If not, the System 1000 may prompt the User 1 to acquire Tokens 50 by providing 3410 the User 1 with options to acquire Tokens 50 by interacting with the network, as in the Method 2000 of FIG. 2. Once Tokens 50 are acquired, the System 1000 again will check 3400 if the User 1 has Tokens 50 to divest 3500 in exchange for access to the Internet 150. If yes, the System 1000 may prompt the User 1 to divest 3500 Tokens 50 in exchange for access to the Internet 150. If the User 1 declines, the process may end 3510. If the User 1 chooses to divest 3500 Tokens 50 in exchange for access, the System 1000 receives 3600 the Tokens 50 from the User 1 and grants 3700 the User 1 access to the Internet 150 in the amount of the Access Measure 60 obtained in exchange for, and relative to the value of, divested Tokens 50.

Figure 4:
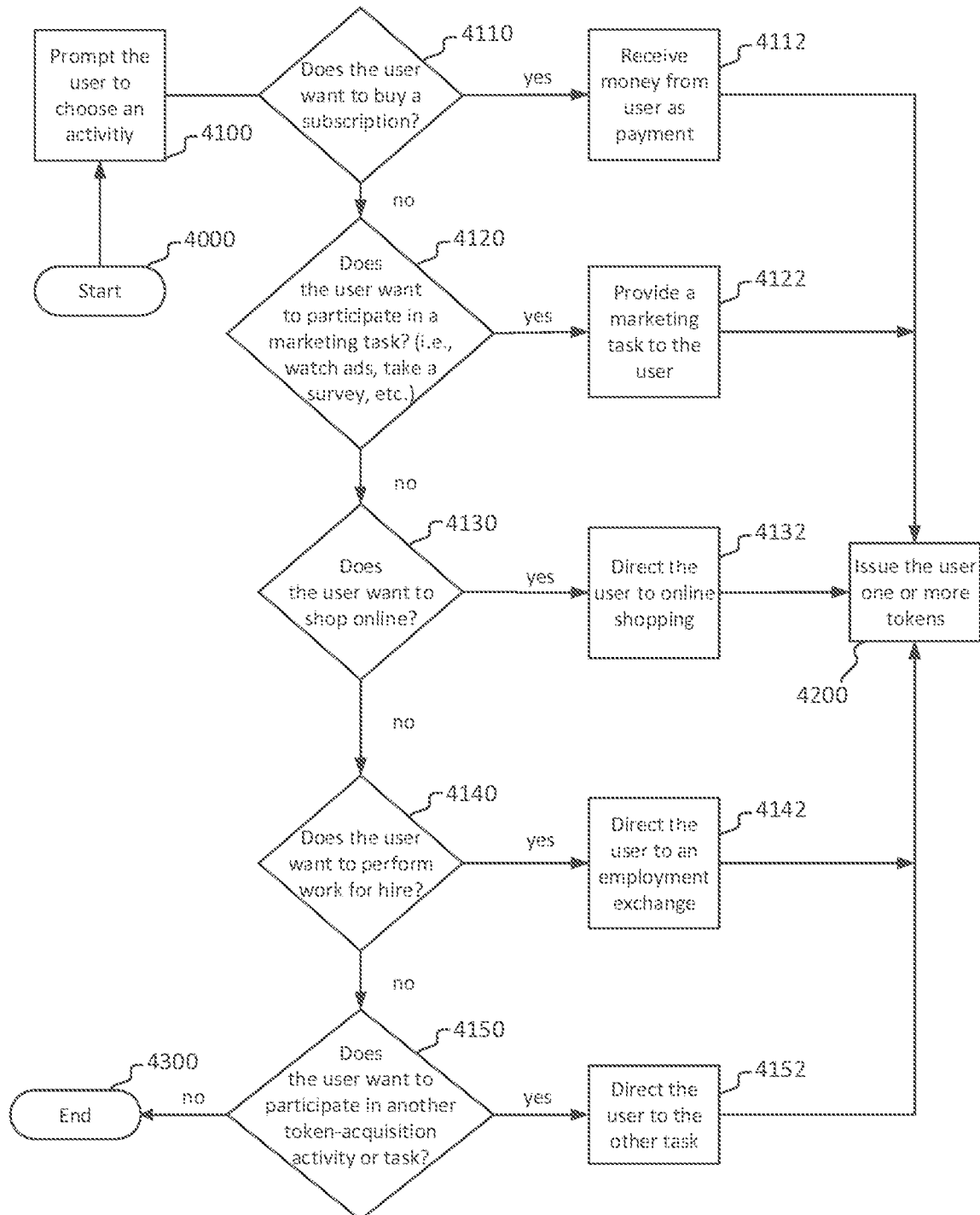
FIG. 4 shows a block diagram of a further exemplary method, depicting exemplary embodiments by which a user may earn digital currency by interacting with the network of FIG. 1, according to aspects of the invention.

Referring to FIG. 4, FIG. 4 shows a block diagram of a further exemplary Method 4000, depicting exemplary embodiments by which a User 1 may earn Digital Currency 50 by interacting with the network of System 1000 in FIG. 1. User 1 may begin after having logged into System 1000, and having accessed a token-acquisition portion of the User Interface 20 of System 1000. The System 1000 may prompt 4100 the User 1 to choose from various token-acquisition activities to acquire a Token 50. For instance, the System 1000 may ask 4110 the User 1 whether the User 1 wants to purchase a subscription, and if yes, the System 1000 receives 4112 monetary payment from the User 1 and then credits the User Waller 40 by issuing 4200 the User 1 one or more Tokens 50. In some embodiments, the Network Store 70 may be adapted to offer a purchase of a subscription as a token-acquisition activity; and the Transaction Database 90 may be adapted to interact with the Network Store 70 to report the purchase of the subscription as token-acquisition activity as a basis to credit a Token 50 to the User Account. If the User 1 chooses not to purchase a subscription, the System 1000 may ask 4120 the User 1 if the User 1 wants to participate in a marketing task, such as watch advertising or take a survey. If yes, the System 1000 provides 4122 the User 1 with the marketing task, and once the marketing task is completed, issues 4200 the User 1 one or more Tokens 50. If the User 1 chooses not to participate in a marketing task, the System 1000 may ask 4130 the User 1 if the User 1 wants to shop online. If yes, the System 1000 provides 4132 the User 1 with access to shop online, and once the shopping is completed (which may or may require that an online purchase be made by the User 1), the System 1000 issues 4200 the User 1 one or more Tokens 50. If the User 1 chooses not to shop online, the System 1000 may ask 4140 the User 1 if the User 1 wants to perform work for hire. If yes, the System 1000 provides 4142 the User 1 with access to perform the work for hire, such as connecting the User 1 to a Job Service 120 that serves as an employment or consulting exchange. Once the work for hire is completed, the System 1000 issues 4200 the User 1 one or more Tokens 50. If the User 1 chooses not to perform work for hire, the System 1000 may ask 4150 the User 1 if the User 1 wants to perform some other token-acquisition activity or task. If yes, the System 1000 provides 4152 the User 1 with access to perform the other token-acquisition activity or task, and once completed, issues 4200 the User 1 one or more Tokens 50. If the User 1 chooses not to perform some other token-acquisition activity or task, the process may end 4300, and the System 1000 may redirect the User 1 out of the token-acquisition portion of the User Interface 20.

The foregoing description discloses exemplary embodiments of the invention. While the invention herein disclosed has been described by means of specific embodiments and applications thereof, numerous modifications and variations could be made thereto by those skilled in the art without departing from the scope of the invention set forth in the claims. Modifications of the above disclosed apparatus and methods that fall within the scope of the claimed invention will be readily apparent to those of ordinary skill in the art. Accordingly, other embodiments may fall within the spirit and scope of the claimed invention, as defined by the claims that follow hereafter.

In the description above, numerous specific details are set forth in order to provide a more thorough understanding of embodiments of the invention. It will be apparent, however, to an artisan of ordinary skill that the invention may be practiced without incorporating all aspects of the specific details described herein. Not all possible embodiments of the invention are set forth verbatim herein. A multitude of combinations of aspects of the invention may be formed to create varying embodiments that fall within the scope of the claims hereafter. In addition, specific details well known to those of ordinary skill in the art have not been described in detail so as not to obscure the invention. Readers should note that although examples of the invention are set forth herein, the claims, and the full scope of any equivalents, are what define the metes and bounds of the invention protection.

What is claimed is:

1. A token exchange system comprising:
   a computer;
   a user interface adapted to provide a user with functionality to log into the token exchange system;
   a virtual private network (VPN) and/or a protocol that manages a user connection to and access with the Internet, wherein the protocol encrypts data;
   a user account database adapted to:
      interact with the user interface; and
      manage a user account with which the user may log into the token exchange system;
   a user wallet adapted to include and account for a token as a credit to the user account;
   a transaction database adapted to manage token exchange activity of the user account; and
   a carrier interface adapted to provide the system with connectivity and access to the Internet,
   wherein the user interface is adapted to:
      provide the user account with an acquisition opportunity to acquire a token in exchange for completion of a token-acquisition activity;
      credit the user account with the token added to the user wallet upon completion of the token-acquisition activity;
      provide the user account with a divestiture option to divest the token in exchange for access to the Internet; and
      divest the user account of the token removed from the user wallet upon exchanging the token for access to the Internet; and,
   wherein the carrier interface is adapted to provide the user interface with connectivity and access to the Internet upon the user account divesting the token removed from the user wallet in exchange for access to the Internet.

2. The token exchange system of claim 1, further comprising:
   an access measure by which the access by the user account to the Internet is measured; and
   a session gauge adapted to:
      permit the user account to access the Internet in accordance with the access measure obtained by the user account in exchange for the token; and
      terminate access to the Internet by the user account upon exhaustion of the access measure.

3. The token exchange system of claim 2,
   wherein the access measure is selected from a group consisting of: an access time, comprising a block of time accessing the Internet and an access data, comprising a block of data transferred in accessing the Internet,
   wherein the session gauge is adapted to measure how much time elapses during access to the Internet by the user account; and wherein the session gauge is adapted to measure how much data are transferred during access to the Internet by the user account.

4. The token exchange system of claim 1, further comprising:
a network bank adapted to receive payments from the user account and track credits of tokens to, and debits of tokens from, the user account.

5. The token exchange system of claim 1, further comprising:
a network store adapted to:
offer items for purchase by the user account;
execute purchases by the user account; and
report purchase activity as the token-acquisition activity to credit the token the user account.

6. The token exchange system of claim 5, wherein:
the network store is further adapted to offer the purchase of the subscription as the token-acquisition activity; and
the transaction database is adapted to interact with the network store to report the purchase of the subscription as the token-acquisition activity as a basis to credit the token to the user account.

7. The token exchange system of claim 1, wherein:
the token-acquisition activity includes the participation in the marketing activity; and
the transaction database is adapted to interact with a third-party marketing service to report the participation in the marketing activity as the token-acquisition activity as a basis to credit the token to the user account.

8. The token exchange system of claim 1, wherein:
the token-acquisition activity includes the online shopping; and
the transaction database is adapted to interact with a third-party vendor to report the online shopping as the token-acquisition activity as a basis to credit the token to the user account.

9. The token exchange system of claim 1, wherein:
the token-acquisition activity includes the performance of work for hire; and
the transaction database is adapted to interact with a third-party job service to report the performance of the work for hire as the token-acquisition activity as a basis to credit the token to the user account.

10. A method for providing a token exchange system, the method comprising:
providing a user interface adapted to provide a user with functionality to log into the token exchange system;
providing a virtual private network (VPN) and/or a protocol that manages a user connection to and access with the Internet, wherein the protocol encrypts data;
providing a user account database adapted to interact with the user interface and manage a user account with which the user may log into the system;
providing a user wallet adapted to include and account for a token as a credit to the user account;
providing a transaction database adapted to manage token exchange activity of the user account;
providing a carrier interface adapted to provide the system with connectivity and access to the Internet;
providing the user account with an acquisition opportunity to acquire the token in exchange for completion of a token-acquisition activity;
crediting the user account with the token added to the user wallet upon completion of the token-acquisition activity;
providing the user account with a divestiture option to divest the token in exchange for access to the Internet;
divesting the user account of the token removed from the user wallet upon exchanging the token for access to the Internet; and
providing the user interface with connectivity and access to the Internet upon the user account divesting the token removed from the user wallet in exchange for access to the Internet.

11. The method of claim 10, further comprising:
providing an access measure by which the access by the user account to the Internet is measured; and
providing a session gauge adapted to:
permit the user account to access the Internet in accordance with the access measure obtained by the user account in exchange for the token; and
terminate access to the Internet by the user account upon exhaustion of the access measure.

12. The method of claim 11,
wherein the access measure includes an access time comprising a block of time accessing the Internet,
wherein the session gauge is adapted to measure how much time elapses during access to the Internet by the user account, and
wherein the method further comprises:
measuring how much time the user account accesses the Internet; and
terminating the access to the Internet when the access time is exhausted.

13. The method of claim 12,
wherein the access measure includes an access data comprising a block of data transferred in accessing the Internet,
wherein the session gauge is adapted to measure how much data are transferred during access to the Internet by the user account, and
wherein the method further comprises:
measuring how much data are transferred as the user account accesses the Internet; and
terminating the access to the Internet when the access data is exhausted.

14. The method of claim 10, further comprising:
providing a network bank adapted to receive payments from the user account and track credits of tokens to, and debits of tokens from, the user account.

15. The method of claim 10, further comprising:
providing a network store adapted to:
offer items for purchase by the user account;
execute purchases by the user account; and
report purchase activity as the token-acquisition activity to credit a token the user account.

16. The method of claim 15,
wherein the network store is adapted to offer a purchase of the subscription as the token-acquisition activity,
wherein the transaction database is adapted to interact with the network store to report the purchase of the subscription as the token-acquisition activity as a basis to credit a token to the user account, and
wherein the method further comprises:
offering the purchase of the subscription as the token-acquisition activity; and,
reporting the purchase of the subscription as token-acquisition activity as a basis to credit a token to the user account.

17. The method of claim 10,
wherein the token-acquisition activity includes the participation in the marketing activity, wherein the transaction database is adapted to interact with a third-party marketing service to report the participation in the marketing activity as the token-acquisition activity as a basis to credit a token to the user account, and wherein the method further comprises:
- offering the participation in marketing activity as the token-acquisition activity; and
- reporting the participation in marking activity as token-acquisition activity as a basis to credit a token to the user account.

18. The method of claim 10, wherein the token-acquisition activity includes the online shopping, wherein the transaction database is adapted to interact with a third-party vendor to report the online shopping as the token-acquisition activity as a basis to credit a token to the user account, and wherein the method further comprises:
- offering the online shopping as the token-acquisition activity; and,
- reporting the online shopping as token-acquisition activity as a basis to credit a token to the user account.

19. The method of claim 10, wherein the token-acquisition activity includes the performance of the work for hire, wherein the transaction database is adapted to interact with a third-party job service to report the performance of the work for hire as the token-acquisition activity as a basis to credit a token to the user account, and wherein the method further comprises:
- offering the performance of work for hire as the token-acquisition activity; and,
- reporting the performance of work for hire as token-acquisition activity as a basis to credit a token to the user account.

* * * * *